United States Patent [19]
Wilkinson et al.

[11] Patent Number: 6,122,521
[45] Date of Patent: Sep. 19, 2000

[54] TELECOMMUNICATIONS LOCATING SYSTEM

[76] Inventors: Dian Wilkinson, 2 Carey Ave.; Susan L. Wheatland, 508 E. Broadway St.; George W. Boehne, 1102 Jesse Ave., all of Streator, Ill. 61364

[21] Appl. No.: 08/700,224

[22] Filed: Aug. 20, 1996

[51] Int. Cl.⁷ .................................................. H04Q 7/20
[52] U.S. Cl. ...................... 455/457; 455/427; 455/456; 342/357; 348/14
[58] Field of Search ................... 455/12.1, 38.3, 455/90, 343, 422, 427, 456, 457, 550, 574, 575, 566; 342/352, 357, 409, 451, 457; 340/988, 989, 993; 348/10, 14, 15, 20, 552, 553

[56] References Cited

U.S. PATENT DOCUMENTS

| | | | |
|---|---|---|---|
| 4,106,283 | 8/1978 | Yamashita | 348/552 |
| 4,449,248 | 5/1984 | Leslie et al. | 455/38.3 |
| 5,625,668 | 4/1997 | Loomis et al. | 455/456 |
| 5,627,547 | 5/1997 | Ramaswamy et al. | 342/357 |
| 5,712,899 | 1/1998 | Pace, II | 342/357 |
| 5,806,005 | 9/1998 | Hull et al. | 455/566 |

*Primary Examiner*—Dwayne D. Bost
*Assistant Examiner*—Nay A. Maung
*Attorney, Agent, or Firm*—Rockey, Milnamow & Katz, Ltd.

[57] ABSTRACT

A telecommunications system for locating persons and things which includes a remote unit and a base unit wherein the remote unit includes a receiver for receiving navigational signals and a video means for generating signals representing a visual image of the area in the vicinity of the remote unit. The remote unit then transmits to a base station signals representing the position of the remote unit and a visual image of the area in the vicinity of the remote unit for display at a base station at an external location.

9 Claims, 3 Drawing Sheets

TELECOMMUNICATIONS LOCATING SYSTEM

BACKGROUND OF THE INVENTION

This invention relates to a telecommunications system for persons and things, and more specifically to a telecommunications systems utilizing a global position satellite information in the determination of the location of a person or thing.

Various systems have been used in the prior art to locate persons or things based on global positioning satellite systems for receiving navigation signals from satellites in orbit about the earth. One such system is described in U.S. Pat. No. 5,043,736 which describes a system including both a remote unit and a base unit for ascertaining the global positioning of individuals or objects utilizing a cellular telephone network in combination with a satellite navigation system. The remote unit includes a radio frequency receiver having the capability of receiving navigational signals from satellite in orbit about the earth such as a global positioning or GPS receiver. The base unit also includes a microprocessor to analyze the coded signal and a cellular telephone system including a modem for transmitting signals to the base unit. The remote unit, once activated, receives navigational signals from satellites above the earth and transmits those signals as indicative of the global positioning of the person or thing, with the signals thus received being stored in memory. At appropriate times, the stored position information is transmitted to the base unit by way of a cellular telephone system, and specifically, a modem therefore for transmitting the position information to the base unit.

The base unit thus receives and coordinates the location of the remote, decoding the position data transmitted through the cellular telephone system. That navigational or location information can then be displayed on a visual display at the base station to indicate the coordinates of the remote unit.

While the system described in the aforementioned patent has a number of advantages over other systems theretofore known, it nonetheless is subject to certain disadvantages. For one thing, the system as described in the foregoing prior art patent must be left in the "on" position so that the base unit can continuously track the position of the remote unit. The system as described in the foregoing patent has no capability of activating the remote unit from the base station. That can be a distinct disadvantage in those situations where the remote unit is in the possession of, for example, a small child who has been abducted. Such a small child might not be able to turn on the remote unit, and thus it must be left "on" at all times. That, in turn, adversely affects the useful life of the remote unit because of limitations of electrical power sources for the remote unit. In addition, such a system as described in the foregoing patent has no capability of providing any sort of video signals which might otherwise be used to assist in determining the location of the child or the identity of the perpetrator or perpetrators in the abduction. It is important, particularly with systems used for small children, that a remote unit have the capability of providing a video signal.

It is accordingly an object of the present invention to provide a telecommunications system for locating persons and things which overcomes the foregoing disadvantages.

It is a more specific object of the invention to provide a telecommunications system for locating persons and things which contains both a remote unit and a base station in which the remote unit not only has the capability of sensing global position but also has the capability of providing to the base station a video signal.

It is another specific object of the invention to provide a telecommunications system for locating persons and things having a remote unit which has the capability of being activated from a remote location such as the base station to provide reverse tracking.

It is yet another object of the invention to provide a telecommunications system for locating persons and things, and particularly a remote unit which has been miniaturized so as to be capable of being worn by, for example, a small child.

It is still another object of the present invention to provide a telecommunications system for locating persons and things, and particularly a remote unit therefore, which is not only miniaturized but also can be conveniently camouflaged so that its identity as a remote unit is not immediately apparent.

These and other objects and advantages of the invention will appear more fully hereinafter from the following description of the invention and the drawings.

SUMMARY OF THE INVENTION

The concepts of the present invention reside in a telecommunications system for locating persons and things which includes both a remote unit adapted to be carried on or by a person or thing and a base unit, adapted to be located at an external position in relation to the remote unit. The remote unit includes a receiver for receiving navigational signals, and preferably navigational signals from satellites in orbit about the earth to generate position information signals indicative of the position of the remote unit, video means for generating signals representing a visual image of the area in the vicinity of the remote unit, a telecommunications receiver for receiving signals from an external location which serves to activate at least one or both of the receiver for receiving navigational signals and the telecommunications receiver to thereby allow the remote unit to be activated from the external location, microprocessor means for receiving navigational signals and for receiving the signals representing the visual image, and telecommunications means in communication with the microprocessor to transmit to the external location the position information indicative of the position of the remote unit and video signals representing a visual image of the area in the vicinity of the remote unit. Thus, the remote unit not only has the capability of determining and transmitting to the external location of position information but also a video signal representing a visual image of the area in the vicinity of the remote unit.

The remote unit of the present invention, since it includes a telecommunications receiver having the capability of receiving signals from the external location to activate either the receiver for receiving navigational signals or the video means for generating the signals representing a visual image or both, conserves battery power in the remote unit. Not only does the ability to activate the remote unit from an external location conserve battery power, it also makes it unnecessary for a child, as an example, to activate the remote unit. That is a significant advantage in those situations where the remote unit is carried by a small child who has been taken surreptitiously.

In accordance with a preferred embodiment of the invention, the remote unit can be miniaturized so as to occupy about the same space as a wrist watch. That, in turn, allows the remote unit to be conveniently carried by a small child. In addition, the remote unit can be camouflaged, appearing, for example, as a wrist watch or decorative accessory so as not to reveal to a perpetrator who has taken such a child its nature as a position-indicating remote unit.

The base unit of the present invention includes telecommunications means to receive the navigational signals and video signals from the remote unit and a microprocessor to convert those signals into a display of not only the positional information but also a display of the visual image of the area in the vicinity of the remote unit.

DETAILED DESCRIPTION OF THE INVENTION

Figure 1:
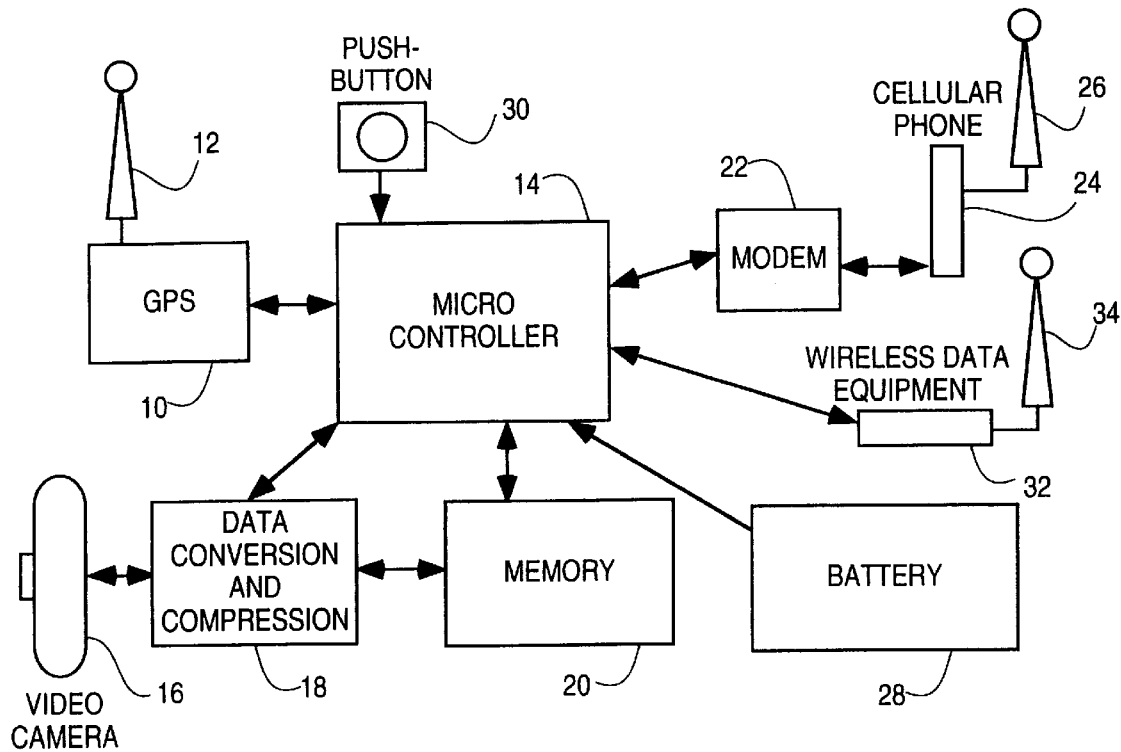
FIG. 1 is a schematic illustration of the remote unit used in the practice of the present invention.

The remote unit employed in the practice of this invention is schematically illustrated in FIG. 1 of the drawings. It includes a receiver 10 for receiving navigational signals, and preferably navigational signals from satellites in orbit about the earth. Preferred for use in the remote unit of the present invention as the receiver for receiving such navigational signals are well known global positioning satellite receivers which have been used for a number of years that receive navigational signals from satellites orbiting about the earth and thus generate position information signals indicative of the position of the remote unit, typically representing latitude and longitude of the remote unit. Such global positioning satellites or GPS systems are themselves well known to those skilled in the art and are commercially available in miniaturized form. The details of such units, because they are themselves well known to those skilled in the art, form no part of the present invention. The GPS system includes a conventional antenna 12 and thus receives navigational signals from satellites and converts those signals into positioning information signals indicative of the position of the remote unit, transmitting that position information to a microprocessor 14 illustrated in FIG. 1 of the drawings.

In the practice of the invention, the remote unit 10 includes video means 16 for generating signals representing a visual image of the area in the vicinity of the remote unit. A number of video means can be used for this purpose, including miniaturized video cameras. It is preferred, however, in the practice of the present invention to use a miniature infrared camera built into a computer chip and marketed by TVX International and TVX, Inc. The TVX system acts as a wide angle or fish eye camera, recording images which are converted by means of a processing unit 18 into digital form for storage in a memory 20 and/or to the microprocessor 14. Thus the remote unit of the present invention allows the remote unit to capture, store and transmit visual images of the area in the vicinity of the remote unit. That is particularly advantageous in those situations in which the remote unit is carried by or worn by a small child. The visual image can be in invaluable assistance in recording and transmitting to an external location information concerning the environment in which the child may be found, and it can even store and transmit to the external location visible images of the perpetrator in the case of the abduction of small children.

The microprocessor 14 programmed to transmit both the position information signals indicative of the position of the remote unit and the signals representing a visual image of the area in the vicinity of the remote unit. This can be done by providing a modem 22 which converts the signals to the appropriate form for transmission through telecommunications means 24 and a suitable antenna 26. The telecommunications means 24 can be any of a variety of data transmission systems. For example, the telecommunications means 24 can simply be a cellular phone programmed to communicate, through conventional telephone equipment, with the external location or base station. Alternatively, it is also possible to employ, as the telecommunication means, a wireless radio transmitter likewise well known to those skilled in the art to transmit the position information signals and the signals representing a visual image of the vicinity of the remote unit to the base station. Of course, the microprocessor 14 is provided with a power means such as a battery 28 to provide the necessary power for operating not only the microprocessor 14 but also the GPS receiver 10 and the video means 16.

In the preferred embodiment of the invention, the remote unit is provided with a manually operable push button 30 to activate the microprocessor which, in turn, activates and controls the receiver 10 for receiving navigational signals and the video means 16. In the practice of the present invention, however, it is highly desirable to include a telecommunications receiver 32 provided with a suitable antenna 34 for receiving signals from an external location which serve to activate at least one of the receivers for receiving navigational signals and the video means. That telecommunications receiver is particularly advantageous in those situations in which the remote unit may be worn by or carried by a small child having the limited capability of activating the remote unit. Thus, the base station can transmit coded signals through the antenna 34 to the telecommunications receiver 32 which, in turn, activates the microprocessor 14 to control one or both of the receivers for receiving navigational signals and the video means. That allows the external location to activate the remote unit even though a small child wearing it lacks the capacity to do so. At the same time, that allows the remote unit to be maintained in an inactive state to conserve battery power from the power means 28, to be activated only in the case where a child, for example, carrying the remote unit has been found to be missing.

Figure 2:
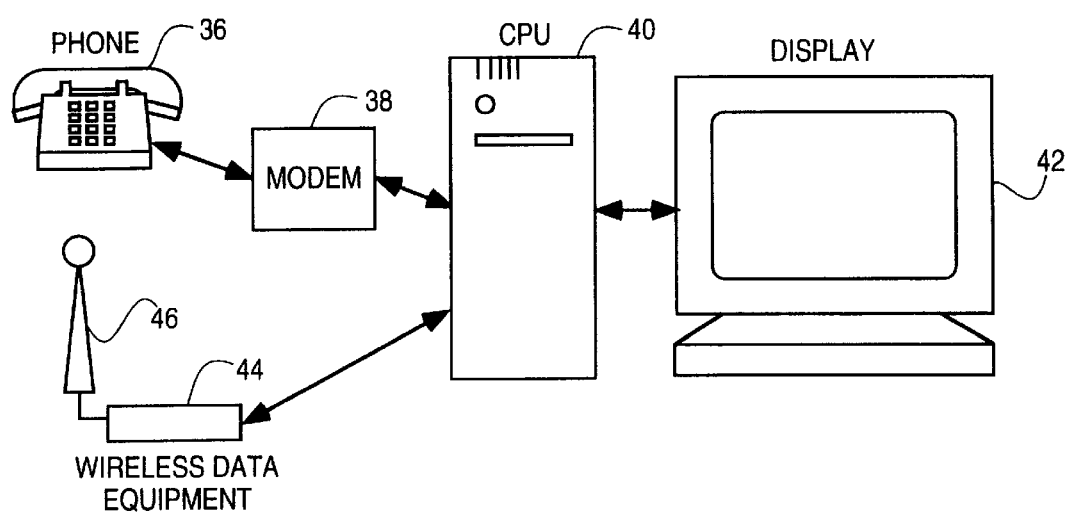
FIG. 2 is a schematic illustration of the base unit employed in the practice of this invention.

The base station, located at the external location, is schematically illustrated in FIG. 2 of the drawings. It includes a receiver 36 having the capability of communicating with the telecommunications transmitter 24. Where, for example, the transmitter 24 is simply a cellular telephone, the receiving unit 36 can be a conventional telephone communicating with the cellular phone 24. If, on the other hand, the transmitter 24 is some other form of telecommunications equipment such as a radio, then the receiver 36 is a radio receiver tuned to the frequency of the transmitter 24 to communicating therewith. In either case, the receiver 36 transmits the position information signals and the signals representing a visual image of the area in the vicinity of the remote unit through a modem 38 to a central processing unit or microprocessor 40. That unit, also conventional hardware, converts the position information signals into a display 42 to indicate to the external location the position of the remote unit. The microprocessor 40 also transmits to the display 42 the visual images taken by the means of the area in the vicinity of the remote unit. Of course, that information can be stored in the microprocessor 40.

The base station also includes a telecommunications transmitter 44 operatively connected to a suitable antenna for transmitting to the remote unit signals to activate the microprocessor 14 of the remote unit to, in turn, activate one or both of the receivers for receiving navigational signals and the video means. For that purposes, the transmitter 44 is tuned to transmit a signal by means of antenna 46 to the antenna 34 and receiver 32 of the remote unit to permit activation of the remote unit from the external location.

Figure 3:
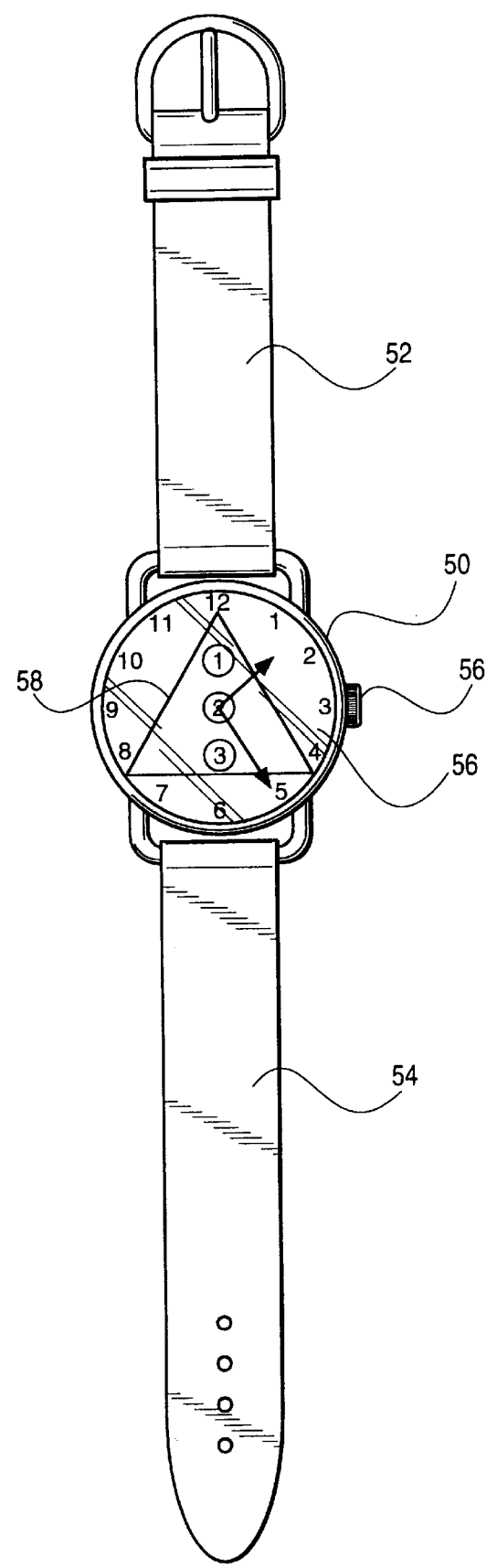
FIG. 3 is a front view of a preferred embodiment of the remote unit used in the practice of this invention.
Figure 4:
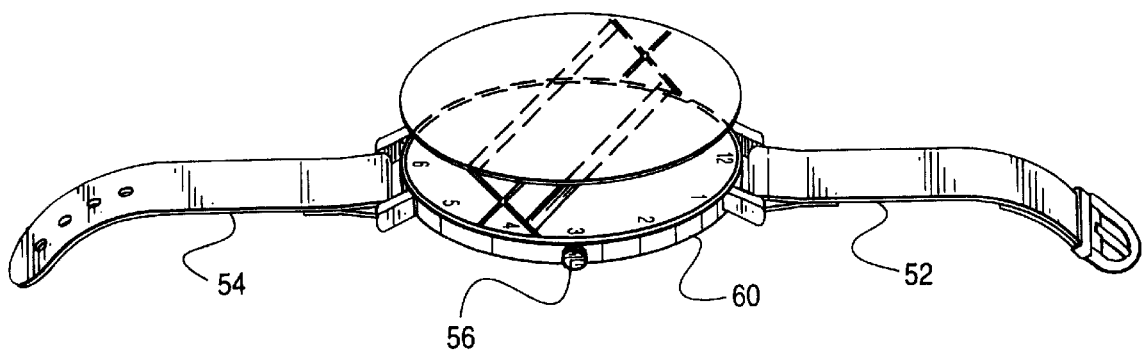
FIG. 4 is a side view of the embodiment shown in FIG. 3.
Figure 5:
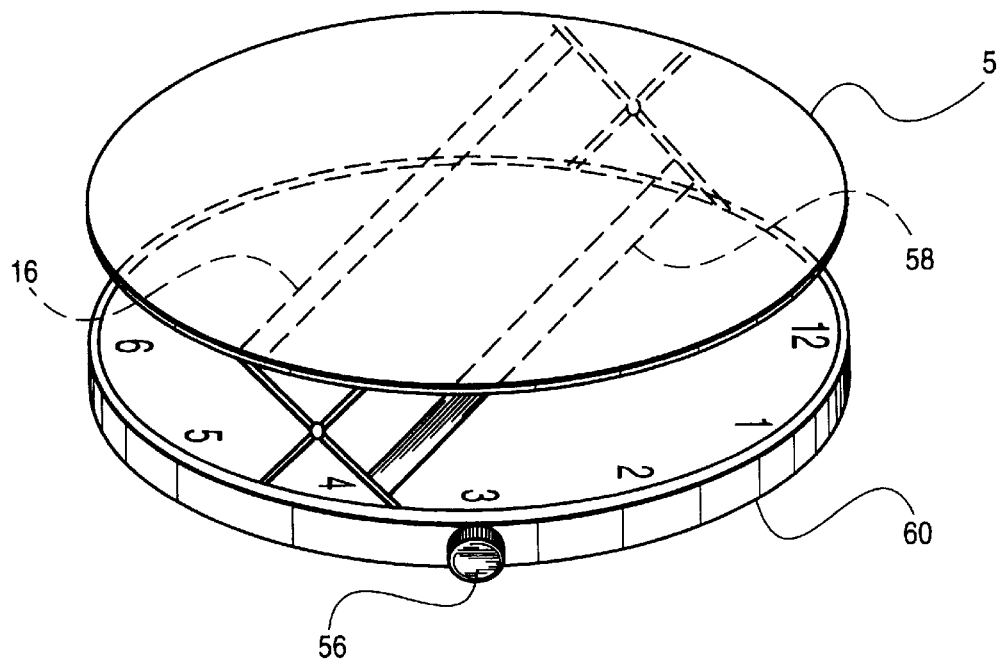
FIG. 5 is an enlarged view of the remote unit illustrated in FIG. 4.

An example of the remote unit which can have all of the external appearances of a watch is illustrated in FIGS. 3–5 of the drawings. As shown in FIG. 3, the remote unit includes a base portion 50 which can be secured to a child's wrist by means of straps 52 and 54. The base unit has the external appearance of a watch face 56 including both numerals and hands. It may be desirable, for example, to employ a triangular shaped antenna 58 on the face of the watch to receive the necessary radio signals described above. The remote unit may have a button 56 which gives the appearance of the knob for changing the time which, in reality, is a button 56 to activate the remote unit by which the face 56 can pop up to reveal the contents of the remote unit base 50 as shown in FIGS. 4 and 5 of the drawings. The electronic components can simply be fitted into the base, including, for example, the video means 16 as well as circuitry in the form of a printed circuit board 58. The base 60 can include a lithium battery, as an example. The precise details as to how the electronic components are fitted within the unit 50 can be varied, and are readily within the skill of the art.

It will be understood that various changes in the details of construction, design and use can be varied by those skilled in the art, and the scope of the invention is defined by the following claims.

What is claimed is:

1. A telecommunications locating system for persons and things comprising (1) a remote unit adapted to be carried on a person or thing, said remote unit comprising:

(a) a receiver for receiving navigational signals from satellites in orbit about the earth and being adapted to generate position information signals indicative of the position of the remote unit;

(b) a video means in the form of a miniature infra-red camera for generating signals representing a visual image of the area in the vicinity of the remote unit;

(c) a telecommunications receiver for receiving signals from an external location adapted to activate at least one of the receivers for receiving navigational signals and the video means;

(d) microprocessor means to control and receive navigational signals from the receiver for receiving navigational signals and for controlling and receiving signals representing a visual image of the areas in the vicinity of the remote unit from the video means;

(e) a telecommunications transmitting means to transmit to an external location the position information signals indicative of the position of the remote unit and the signals representing a visual image of the area in the vicinity of the remote unit; and (2) a base unit, said base unit comprising:

(f) receiving means for receiving the position information signals indicative of the position of the remote unit and the signals representing a visual image of the area in the vicinity of the remote unit;

(g) telecommunications transmitting means to transmit to the telecommunications receiver for receiving signals from an external location to activate at least one of the receivers for receiving navigational signals and the video means; and (h) means for displaying the position of the remote unit and the visual image.

2. A system is defined in claim 1 wherein said receiver for receiving navigational signals is a global positioning satellite receiver.

3. A system is defined in claim 1 wherein the video means generates analog signals, and the video means includes means to convert the analog signals to digital signals for transmitting to an external location.

4. A system is defined in claim 1 wherein the telecommunications transmitting means includes a cellular phone means and modem means operatively connected therewith whereby the position information signals and the signals representing a visual image are transmitted through the modem and over the cellular phone means.

5. A system is defined in claim 1 wherein the telecommunications transmitting means is a wireless radio transmitter.

6. A system is defined in claim 1 wherein the remote unit contains a push button to activate the microprocessor means to control and activate the receiver for receiving navigational signals and the video means for receiving video signals representing a visual image.

7. A remote unit for use in a telecommunications locating system for persons and things comprising:

(a) a receiver for receiving navigational signals from satellites in orbit about the earth and being adapted to generate position information signals indicative of the position of the remote unit;

(b) a video means in the form of a miniature infra-red camera for generating signals representing a visual image of the area in the vicinity of the remote unit;

(c) a telecommunications receiver for receiving signals from an external location adapted to activate at least one of the receivers for receiving navigational signals and the video means;

(d) microprocessor means to control and receive navigational signals from the receiver for receiving navigational signals and for controlling and receiving signals representing a visual image of the areas in the vicinity of the remote unit from the video means; and (e) a telecommunications transmitting means to transmit to an external location the position information signals indicative of the position of the remote unit and the signals representing a visual image of the area in the vicinity of the remote unit.

8. A unit is defined in claim 7 wherein the remote unit has been miniaturized to about the size of a wrist watch.

9. A system is defined in claim 7 wherein said receiver for receiving navigational signals is a global positioning satellite receiver.

* * * * *